(12) United States Patent
Mueller et al.

(10) Patent No.: US 9,363,252 B2
(45) Date of Patent: Jun. 7, 2016

(54) METHOD FOR CUSTOMIZING SOFTWARE APPLICATIONS

(71) Applicant: BMC Software, Inc., Houston, TX (US)

(72) Inventors: Douglas Mueller, Palo Alto, CA (US); Charles A. Mousseau, Palo Alto, CA (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 14/454,122

(22) Filed: Aug. 7, 2014

(65) Prior Publication Data

US 2014/0358966 A1 Dec. 4, 2014

Related U.S. Application Data

(63) Continuation of application No. 12/835,908, filed on Jul. 14, 2010, now Pat. No. 8,832,652.

(60) Provisional application No. 61/318,157, filed on Mar. 26, 2010.

(51) Int. Cl.
*G06F 17/30* (2006.01)
*H04L 29/06* (2006.01)
*G06F 9/445* (2006.01)
*G06F 9/44* (2006.01)

(52) U.S. Cl.
CPC *H04L 63/08* (2013.01); *G06F 8/65* (2013.01); *G06F 8/71* (2013.01); *G06F 9/44536* (2013.01); *G06F 17/30424* (2013.01)

(58) Field of Classification Search
CPC ............... G06F 8/82; G06F 8/65; G06F 8/71
USPC ........................................................... 707/769
See application file for complete search history.

(56) References Cited

U.S. PATENT DOCUMENTS

| | | | |
|---|---|---|---|
| 7,003,695 B2 | 2/2006 | Li | |
| 8,683,453 B2 * | 3/2014 | Patel et al. | 717/139 |
| 8,832,652 B2 * | 9/2014 | Mueller | G06F 8/65 717/121 |
| 2003/0233489 A1 | 12/2003 | Blaser et al. | |
| 2008/0134154 A1 * | 6/2008 | Patel et al. | 717/139 |
| 2011/0239190 A1 * | 9/2011 | Mueller | G06F 8/65 717/121 |

* cited by examiner

*Primary Examiner* — John Chavis
(74) *Attorney, Agent, or Firm* — Brake Hughes Bellermann LLP

(57) ABSTRACT

In one example embodiment, a method includes, in one of an interpreted computer environment and a compiled computer environment, generating a software application. Generating the software application includes associating at least one first overlaid object with a first overlay group, the at least one overlaid object having a corresponding base object of the software application, assigning a first permission to the first overlay group, determining if a user is authorized to use the first overlay group based on the first permission, and configuring the software application to execute in the computer system using the at least one first overlaid object and the corresponding base object upon determining the user is authorized to use the first overlay group.

20 Claims, 11 Drawing Sheets

METHOD FOR CUSTOMIZING SOFTWARE APPLICATIONS

CROSS-REFERENCE TO RELATED APPLICATIONS

This application is a continuation application of U.S. application Ser. No. 12/835,908, filed Jul. 14, 2010, entitled "Method of Customizing Software Applications", which claims priority to U.S. Provisional Application No. 61/318,157, filed Mar. 26, 2010, "In Support of Application Customizations", both of which are hereby incorporated in their entirety.

BACKGROUND

This disclosure relates generally to the field of computer programming. More particularly, but not by way of limitation, it relates to a technique for customizing software applications.

It is typical for a customer to acquire a software package from a vendor or to receive a software package from another organization and use it within the customer's environment. Often, there is the desire to make some number of changes to the software to change the operation or functionality of the software to meet the needs of the customer's environment better or to add additional functionality to cover additional needs for the customer. These changes may be to the logic, structures, data definition or capability, or any other alteration in the functionality of the solution.

However, there comes a point where there is a revision or patch or new release of the software package from the supplier. At this point, the customer is left with the issue that the product has changed from the original definition. How can the customer tell what it has changed? How can the customer apply an update to get the fixes and additional functionality of the new version from the supplier but still preserve the customer's customizations?

In general, this is a very difficult problem. Usually, the solution has been a requirement to redo the customizations on the new release.

Another problem has been a need to have several different sets of customizations of a single environment to satisfy different constituencies using the software package in a shared environment. Each of these constituencies may want to independently (and often in conflict) modify the solution for their specific operation.

This is another difficult problem, usually solved by having independent implementations for the each group, which makes sharing of data difficult and makes the environment more complex.

SUMMARY

In one embodiment, a method is disclosed. The method includes, in one of an interpreted computer environment and a compiled computer environment, generating a software application. Generating the software application includes associating at least one first overlaid object with a first overlay group, the at least one overlaid object having a corresponding base object of the software application, assigning a first permission to the first overlay group, determining if a user is authorized to use the first overlay group based on the first permission, and configuring the software application to execute in the computer system using the at least one first overlaid object and the corresponding base object upon determining the user is authorized to use the first overlay group.

In another embodiment, a networked computer system is disclosed. The networked computer system includes a server computer, a datastore, coupled to the server, a client computer, communicatively coupled to the server computer, a plurality of software application base objects, stored in the datastore, a plurality of software application overlaid objects, stored in the datastore, each of the plurality of software application overlaid objects being configured to change a construct definition of a corresponding software application base object of the plurality of software application base objects, wherein at least one first overlaid object is associated with a first overlay group, the at least one overlaid object having a corresponding base object, a first permission, stored in the datastore, to the first overlay group, and a runtime environment, stored in the datastore. The runtime environment including instructions that when executed cause the server to receive a request from the client computer to execute a software application, determine if the client computer is authorized to use the first overlay group based on the first permission, and configure the software application to execute in the computer system using the at least one first overlaid object and the corresponding base object upon determining the user is authorized to use the first overlay group.

In yet another embodiment, a computer system is disclosed. The computer system including a processor, a datastore, coupled to the processor, a plurality of software application base objects, stored in the datastore, a plurality of software application overlaid objects, stored in the datastore, each of the plurality of software application overlaid objects being configured to change a construct definition of a corresponding software application base object of the plurality of software application base objects, a software application, stored in the datastore, configured for execution by the processor. The software application including a first software application base object and a runtime environment for the software application, stored in the datastore. The runtime environment including instructions that when executed cause the processor to determine if a user of the first software application is authorized to use a first software application overlaid object based on a permission associated with a first overlay group and configure the software application to execute in the computer system using the first software application overlaid object and a corresponding software application base object upon determining the user is authorized to use a first software application overlaid object.

In yet another embodiment, a computer readable medium is disclosed. The computer readable medium contains instructions for a programmable control device stored thereon wherein the instructions cause a programmable control device to perform the method described above.

DETAILED DESCRIPTION

Figure 1:
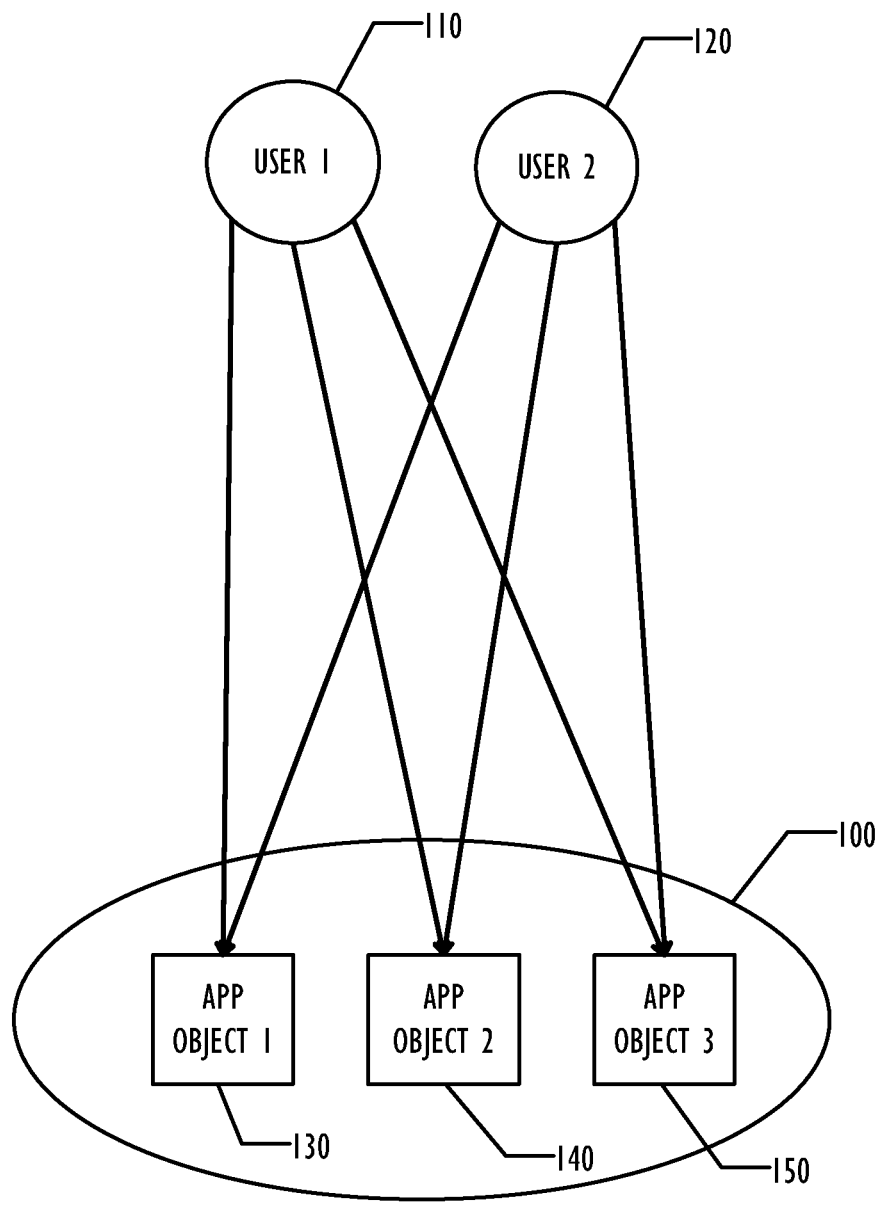
FIG. 1 illustrates, in block diagram form, an example of an application according to the prior art.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Various embodiments disclosed herein recite techniques for allowing customization of an application with overlays that allow preservation of the unmodified application, as well as the modified application. The overlay technique allows a single instance of application to be used by different users with different customizations, including use without any customizations.

What is needed is a method for making changes that are separate from but related to the original definition and are loosely connected so that things can change on either side without affecting the other side of the definition. This method should allow for multiple, independent chains of changes that have configurations for which users are using which sets of changes.

A number of technologies have attempted solving portions of the problem identified above, but they do not solve the larger problem of independent customizations being simultaneously used and of allowing any aspect of the system to be overlaid independently of any other. Some of these attempted partial solutions include the following:

Shared Libraries/DLLs allow for providing alternate definitions, but only for limited aspects of the application that have been predefined. There is no ability to layer definitions, definitions are simply replaced.

CSS (Cascading Style Sheets) allow for the definition of display properties for constructs in the system. They support hierarchical and parallel definition. They do not allow for changing of the fundamental construct definitions of the application but only for display options and characteristics of the objects within the definition. This is not a solution, because the user is not customizing the logic or constructs of the system.

CMDB overlay datasets define an overlay model, but for data content only, and not for application definitions. There is no concept of parallel definition threads being executed and coordinated because they simply define data.

A solution to the problem described above is based around the concept of using an overlay to specify an alteration to some component of the application, preserving the original definition and the overlay definition as part of the definition of the system, but applying the overlay definition to the execution path while suppressing the original definition.

Various embodiments may allow the customer to make additions to, changes to, or even deletions from the source definition by overlaying any logic or data definition or other construct within the system. At run time or compile time, depending on whether the application runs in an interpreted or compiled environment, the definitions may be resolved through the overlay with any definition in the overlay being used instead of the original source definition and the source definition being used when there is no overlay.

This model allows an update from the source of the application to supply updates that change the source definition to be applied without worrying about the overlays. The entire set of customizations may be preserved within the overlay. After the update of the source application, all changes may still be present and linked to the appropriate place within the application.

By gathering the overlay definition into overlay groups, multiple different overlays may be defined for the same construct or multiple different levels of overlay may be used with each overlay reading through to the overlay below it until the original definition is reached.

Overlay groups may also be created parallel to each other to allow the definition of multiple, independent customizations of the definition. In such an embodiment, users may be assigned or allowed to select which overlay group they may use and the set of definitions from that overlay group (and any item on the chain below them) may be used. In one embodiment, users may be assigned to or allowed to select multiple overlay groups. In such an embodiment, precedence relationships may be defined between the multiple overlay groups. Thus, an application environment may be provided where there may be different customized functionality for different users.

In further embodiments, security may be applied to these overlay groups to control who can and cannot see or use the overlay definitions within the group. This allows the security to determine whether a user can or cannot see or use the overlay group and so the overlay definitions within it.

By simply changing the definition of which overlay is used, the version of the application that runs (original, partially overlaid, fully overlaid) may be changed.

In some embodiments, the customizations to the environment may be always clearly identifiable and the overlaid definition as well as the overlay definition at any level may be always available if desired.

Before customization, the application from the application provider or vendor may be installed. Users may have access to the constructs that define the application and run the application as it is designed and configured from the source. All users may use the same definition constructs that define the application and control its operation.

FIGS. 1-6 are block diagrams that illustrate the customization concept implemented by the various embodiments disclosed below, with 2 users and an application with 3 application objects. The number of users and the number of application objects are illustrative and by way of example only, and the disclosed techniques may be used with any number of users and any number of application objects.

FIG. 1 illustrates an unmodified application 100 with 3 application objects 130, 140, and 150 according to the prior art. Each of the 2 users 110 and 120 may execute application 100, using all 3 application objects 130, 140, and 150. In conventional techniques, if user 110 wanted to customize application 100 differently than user 120, different copies of application 100 are created and separately customized. The unmodified application 100 is therefore unavailable to user 110 unless a separate copy of the unmodified application 100 is preserved. This may result in many permutations or copies of application 100, making management of the application 100 more difficult. Furthermore, if the vendor of application 100 updates the application 100, then all permutations would need to be re-created.

Once the original application is in place, the customer may desire to make a change to the application. This change may be something that was not planned by the application provider or vendor, thus the customer wants to customize the application to add or modify the functionality of the application.

Various embodiments allow making customizations to constructs in a parallel space to the application. The customizations may be made by supplying an alternate definition for the construct. Any construct may have a parallel construct provided and any number of constructs may be provided with an alternate definition.

The original definition remains unchanged and customizations may be recorded in these parallel definitions. At any time, the customer may use the original (or definition or the overlay definition.

In one embodiment, at run time for interpreted environments or at compile time for compiled environments, every construct may be checked to see if there is an overlay definition. If so, the overlay definition may be used. If not, the original definition may be used. Thus, a set of constructs may be created that define the application and its operation with the customer's customizations included.

Figure 2:
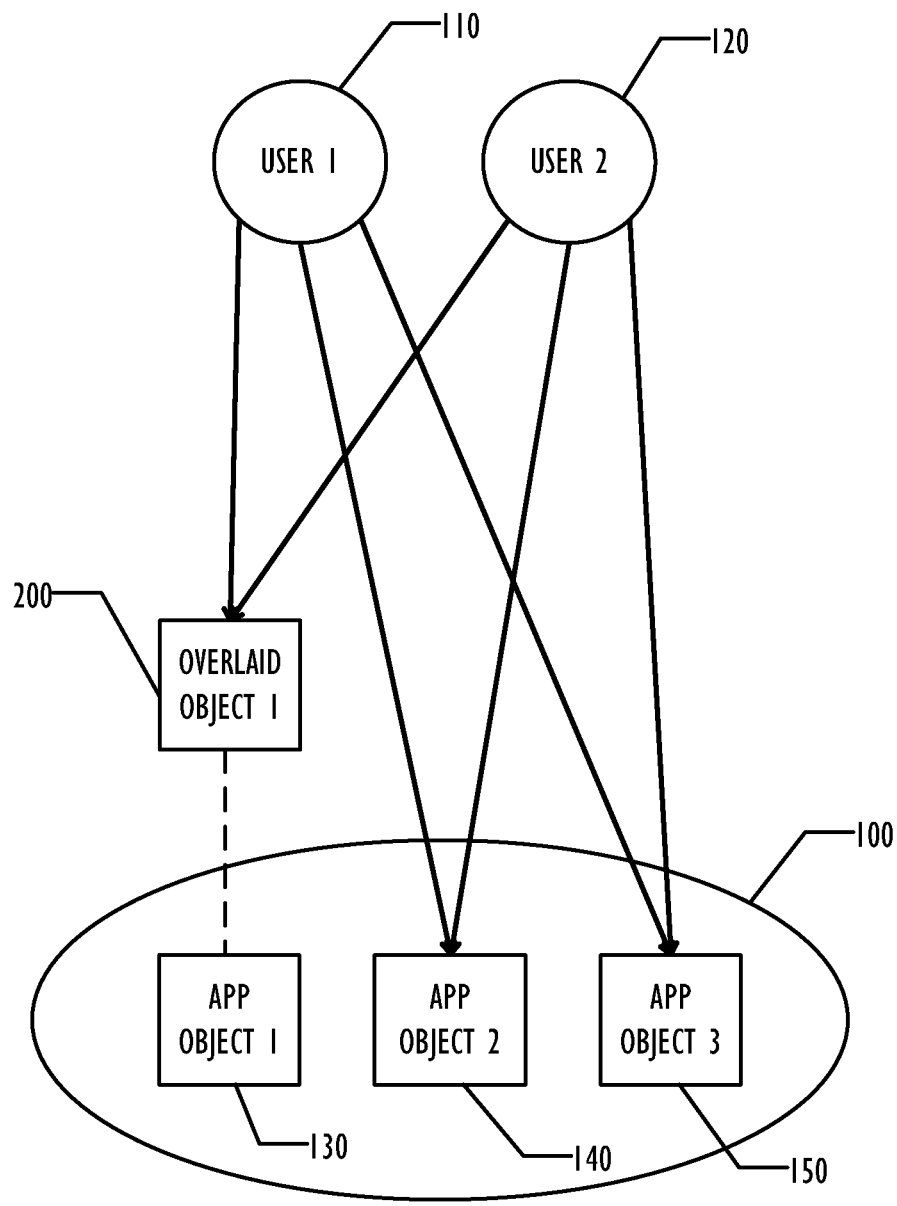
FIG. 2 illustrates, in block diagram form, an embodiment of an application employing an overlaid object.

FIG. 2 illustrates an example of overlay according to one embodiment. In this example, object 130 of the application 100 is overlaid by overlaid object 200. Both users 110 and 120 may use application 100 with overlaid object 200 overlaying or replacing original application object 130 when executing application 100. Application 100 may be modified by the vendor without affecting overlaid object 200, and users 110 and 120 may continue to use customized application 100 with overlaid object 200 even after an update by the vendor to application 100 modifies the application object 130.

In some embodiments, in addition to overlaying an existing definition, a customer may provide new definitions to add to or extend the original definitions. These definitions are slightly different in that they are part of a customization and so part of an overlay, but they themselves do not have an underlying definition that they are overlaying. This allows grouping of customizations whether they are modifying existing constructs or adding new constructs.

There are several differences and enhancements of this approach over existing approaches that are used to allow changed definitions:

Any construct of an application may be overlaid to have its functionality altered. There is no constraint over the scope of the construct. For example, may be a part of a procedure, instead of a complete procedure.

Any construct may be overlaid without any requirement to overlay other related constructs in addition. For example, a DLL must replace all procedures in that DLL even if the customer wants to change only one part of one of them. Using overlays, a customer may overlay only a specific item without overlaying other constructs.

Any construct may be overlaid without the requirement that the application was structured to pre-define clusters of things that can be changed. For example, a customer may change any portion of the application without the application having to be structured to isolate specific operations to allow them to be changed.

Additional constructs may be added to the application if the application is designed to recognize additional constructs.

By using overlays for customizations, the process of upgrading or patching the application when getting a new or updated definition from the application provider or vendor may be dramatically simplified. The new definitions may simply be installed since all customizations are stored separately from the original source definitions. The customer need not be concerned with overwriting a customization or of making the requirement that customizations have to be made again. At the same time, the customizations may still tied to the original definitions, so that the customized changes will still be in place, in the right location, and performing the same function as before the upgrade of the application from the application provider or vendor.

Figure 3:
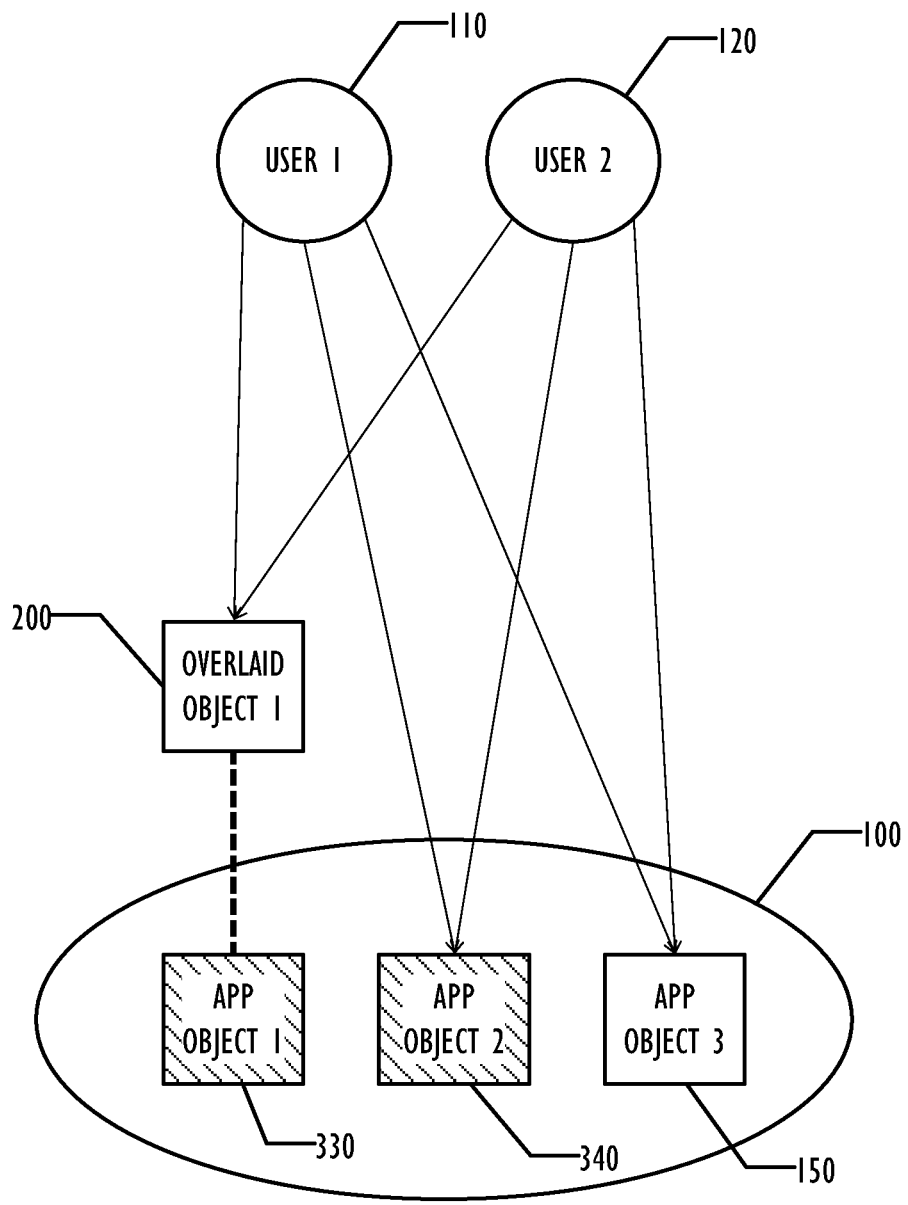
FIG. 3 illustrates, in block diagram form, the application of FIG. 2 as modified by a software vendor.

The disclosed techniques do not remove the base application object 130 from application 100. Thus, if desired, the application 100 may be executed without the overlaid object 200 without the need to preserve multiple versions of the application 100. As illustrated in FIG. 3, application 100 is modified by the application provider or vendor to replace application objects 130 and 140 with updated application objects 330 and 340. Updated object 330 may remain overlaid by overlaid object 200 without changing overlaid object 200, users 110 and 120 may now execute application 100 with updated object 340 and overlaid object 200 instead of updated object 330, without having to change overlaid object 200.

In addition to the basic concept of allowing overlays of constructs in the system in place, embodiments may provide the ability to have multiple, independent sets of overlay definitions.

An Overlay Group is a named collection of overlay or additional definitions. An overlay group may have any construct defined only a single time and may be defined as an overlay of either the source definition or of some other overlay, that there may be both a context and a set of construct definitions making up an overlay group.

The group may be an identified entity, have properties, be referenced, manipulated, imported, exported, and included or excluded as a unit. Some customers may require the use of overlay groups for organization and coordination purposes rather than having independent construct definitions.

An overlay group may overlay an overlay group. This allows for multiple independent levels of overlay. When looking at any definition, the top of the overlay group stack may be considered first, then each level in turn may be considered to find the appropriate set of constructs, where any construct can be overlaid at any level and mask all definitions of that construct below it. Furthermore, any additional construct may be added at any level. At any level, any construct that is in any level below it may also be overlaid, including constructs not present in the layer below but present in layers below that, constructs that are overlaid in the previous level, and constructs that are additional constructs added to a previous level that are not present in the base layer.

Disclosed techniques allow different entities to provide customizations at different times and for different purposes without interfering with each other. One entity may have a set of customizations/extensions/enhancements to the application and may create a first overlay layer. Then, the end user might also want to customize the application by creating a second overlay layer. The base and each overlay layer may be independently modified by each entity. The user of the application may get the benefit of all the changes and each entity may work on the application and its customization of it separately without stepping on each other's changes.

Figure 4:
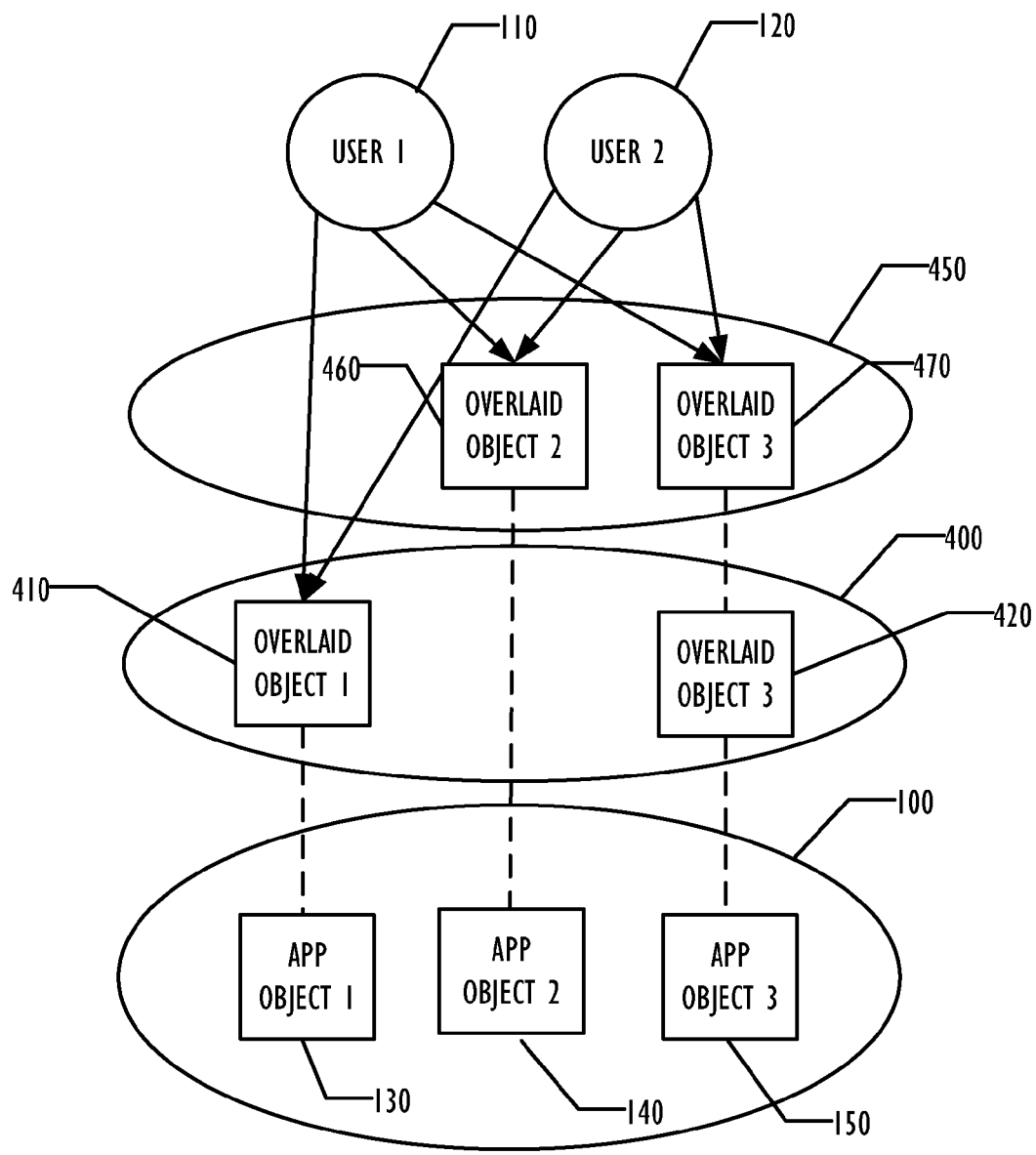
FIG. 4 illustrates, in block diagram form, an embodiment of an application overlaid by stacked groups of overlays.

FIG. 4 illustrates multiple stacked levels of overlays. In this example, level 400 includes overlaid object 410 that overlays application object 130 and overlaid object 420 that overlays application object 150. Overlay level 450 includes overlaid object 460, which overlays application object 140, and overlaid object 470, which overlays application object 150. Users 110 and 120 may then execute application 100 employing overlaid objects 410, 460, and 470. Overlaid object 420 in overlay level 400 is itself overlaid by overlaid object 470 in overlay level 450, and is therefore not employed by either user 110 or 120 in this example. Application objects 130, 140, and 150 are still available and application 100 and another user (not shown) may continue to execute application 100 without any of overlaid objects 410, 420, 460, or 470. Alternately, another user (not shown) may choose to execute application 100 with only overlay level 400 and not overlay level 450, thus employing overlaid objects 410 and 420. All of these users may use the same application instance, avoiding the need to manage and maintain multiple versions of the application 100.

In addition to hierarchical overlay groups, some embodiments may provide for groups that are parallel to each other, allowing multiple overlay groups that may overlay the base definition or each overlay overlaying the same overlay group. Changes to any construct—the same ones or different ones—and additions of constructs can be made to either group. The two groups may be independent of each other.

When used, an end user may request or be assigned to an overlay group and the appropriate overlays may be applied. Thus, a customer may have a different set of constructs executing for different users of a single application. No other known customization solution supports different sets of customizations, possibly conflicting with each other, running within a single application instance, each performing different logic as defined by the user.

Figure 5:
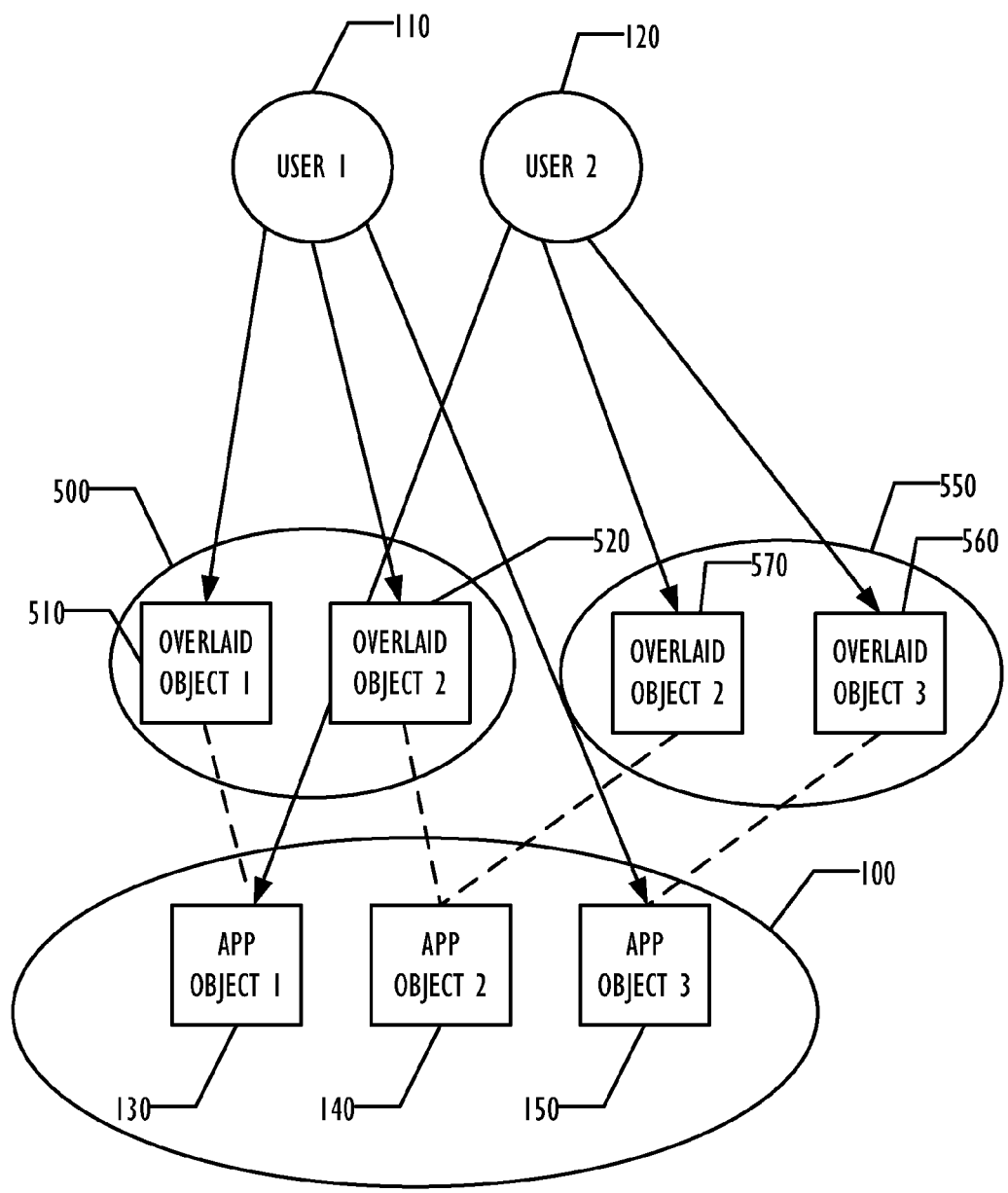
FIG. 5 illustrates, in block diagram form, an embodiment of an application overlaid by parallel groups of overlays.

FIG. 5 illustrates another embodiment of the disclosed techniques. In this embodiment, overlay groups 500 and 550 may be applied in parallel, with user 110 executing application 100 with overlaid group 500 and user 120 executing application 100 with overlay group 550. Overlay group 500 includes overlaid objects 510 and 520, which overlay application objects 130 and 140, respectively. Overlay group 550 includes overlaid object 560, which overlays application object 150, and overlaid object 570, which overlays application object 140. Using overlay groups 500 and 550, user 110 may execute application 100 with overlaid objects 510 and 520, and base application object 150. User 120 may execute application 100 with base application objects 130 and overlaid objects 560 and 570. The same application 100 may also be available for execution without any overlaid objects or overlay groups. The illustrated groups 500 and 550 are illustrative and by way of example only and other groups and arrangement of overlaid objects within overlay groups may be used. For example, although as illustrated in FIG. 5 overlay groups 500 and 550 have no common elements, groups may be defined to overlap, so that some of the overlaid objects may be in multiple groups, while other overlaid objects may be in only a single group.

In one embodiment, security controls may be applied to overlays and overlay groups. For an overlay group, security may be defined in terms of who can or cannot see or use the definitions within that overlay group. When overlays are being processed for a user, any overlay group that the user does not have access to may be bypassed and only overlay groups to which the user has access may be considered.

This allows the creation of hierarchies of overlay groups where some layers are only available to some users without having to create parallel hierarchies with duplicated customizations in groups on each chain, allowing different definitions to be executed for different users within a single instance of the application.

Figure 6:
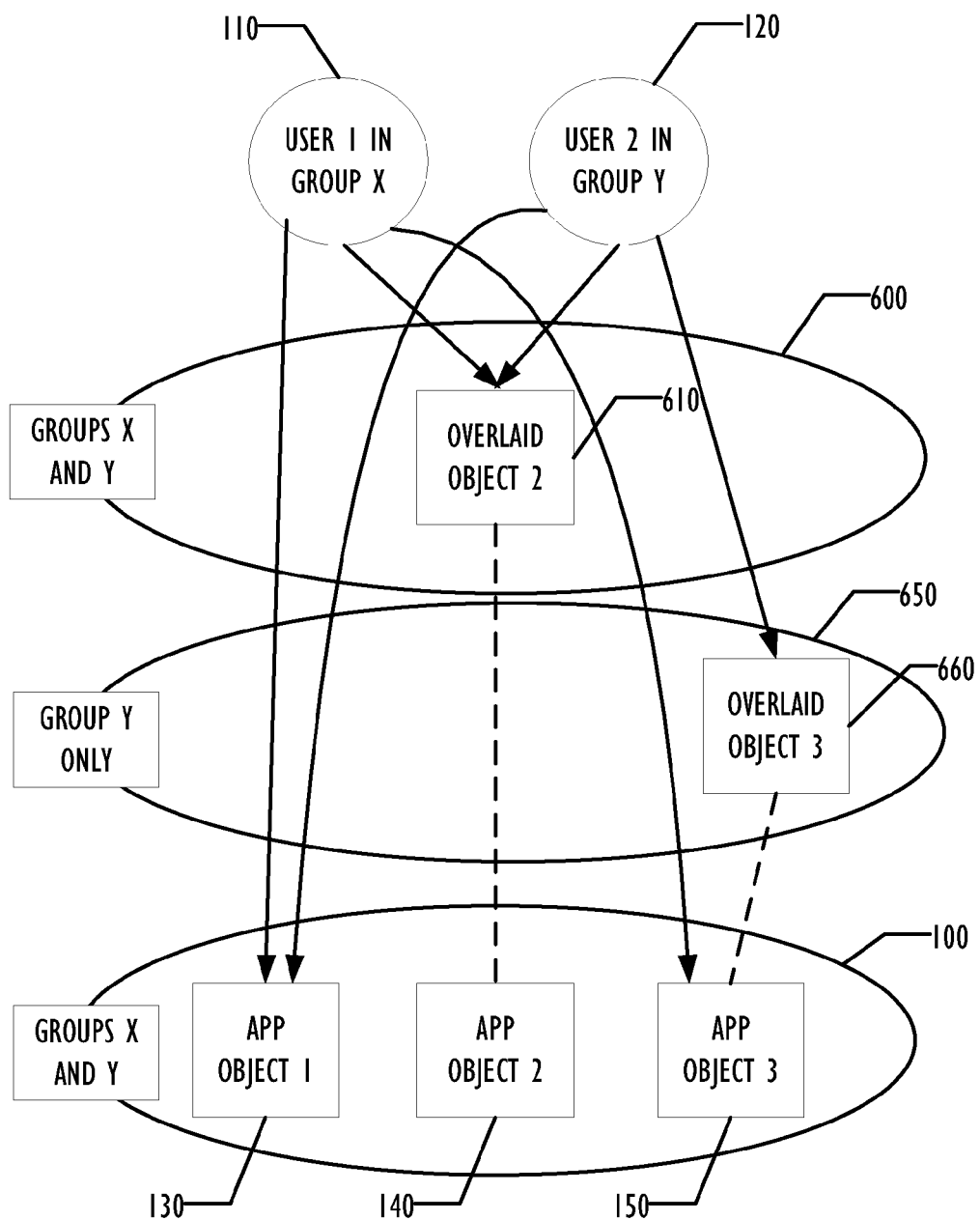
FIG. 6 illustrates, in block diagram form, an embodiment of an application overlaid by access-controlled overlay groups.

Users may have limited access to overlaid objects, using any desired conventional access control technique, such as permission groups or permission lists. FIG. 6 is a block diagram illustrating one embodiment in which permission groups are defined to control access. In this example, permission groups X and Y are defined, with user 110 a member of permission group X and user 120 a member of permission group Y. Overlaid object group 600 may be defined as accessible by members of groups X and Y. Thus, overlaid object 610 may be employed instead of application object 140 when application 100 is executed by either user 110 or user 120.

In contrast, overlay group 650 is defined as accessible only by members of group Y. Thus, when the user 110 executes application 100, application object 150 may be employed. Because user 120 is a member of group Y, when user 120 executes application 100, overlaid object 660 from overlay group 650 may be employed instead of application object 150. Neither overlay group 600 nor overlay group 650 includes an overlay of application object 130, so in this example application object 130 is employed when either user 110 or user 120 executes application 100.

Returning to FIG. 4, if overlay group 450 were assigned to a permissions group of which user 120 is a member and user 110 is not a member, and overlay group of 400 were assigned to a permissions group of which user 110 is a member and not user 120, then the behavior described above would change. User 110 may execute application 100 by employing overlaid objects 410 and 420, as well as application object 140. User 120 may execute application object 100 by employing overlaid objects 460 and 470, as well as application object 130. Thus, the permission-neutral stacking of overlaid objects illustrated in FIG. 4 may be changed by using access control mechanisms such as permission groups.

Different tenants may create separate overlay groups in parallel to each other in one embodiment. The definition changes of each tenant may be completely isolated from and independent of the other tenants. Security may be defined so that none of the users may see what is being done for any other tenant. At runtime, users may have access only to the overlay group for their tenant so they will get the customizations for their tenancy, allowing different definitions to be running at the same time within the same application instance.

Figure 7:
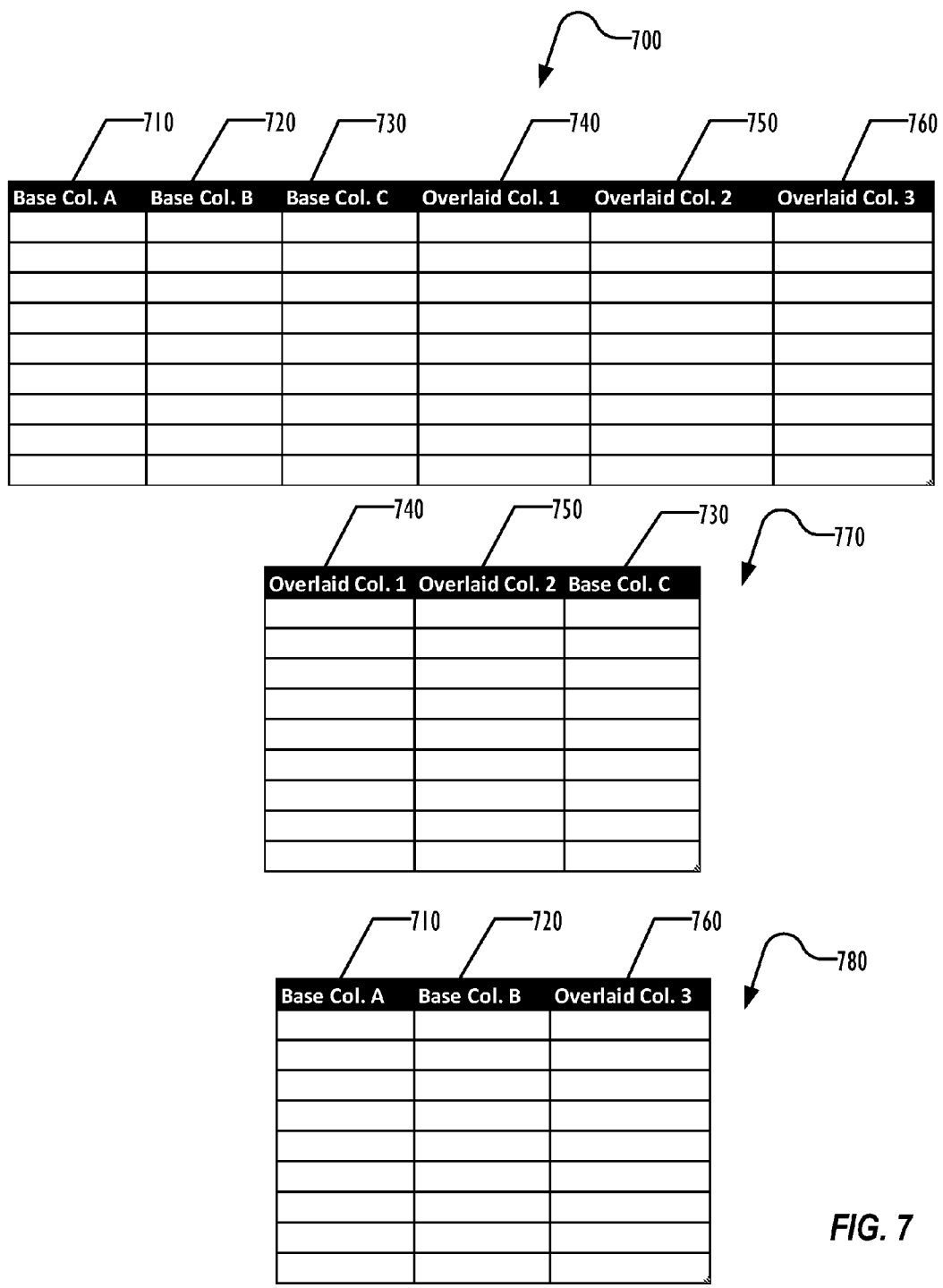
FIG. 7 illustrates, in table form, an embodiment of a database table with overlaid columns.

FIG. 7 illustrates a table 700 illustrating an embodiment in which a database table is overlaid by columns similar to the embodiment illustrated in FIG. 5. In this example, the original table 700 is comprised of columns 710, 720, and 730. By adding columns 740, 750, and 760, views 770 and 780 may be created to allow different views of the table 700. Overlay group 500 of FIG. 5 in this database example comprises columns 740 and 750, while overlay group 550 of FIG. 5 comprises columns 760. Database views may be created to effect the overlay. User 110 may employ view 770, with overlaid columns 740, 750, and base column 730, while user 120 may employ view 780, with base columns 710, 720, and overlaid column 760. Another user may employ a view that includes only original columns 710, 720, and 730.

A similar approach may employ overlaid rows instead of columns, according to other embodiments. Still other embodiments may overlay both rows and columns as desired. Although as illustrated in FIG. 7, the overlaid columns are stored in the table with the original columns, in one embodiment, overlaid columns or rows may be stored in a separate table from the original table, using database joins to perform the overlay.

In one embodiment, overlaid objects may modify characteristics of fields or data. For example, an overlaid object may change the size of a field in a form or in a database table. In some embodiments, restrictions may be placed that limit the types of changes that may be made in an overlaid object. For example, in one embodiment a restriction may prohibit changing a data type in an overlaid object or may prohibit making a data element smaller or larger.

Figure 8:
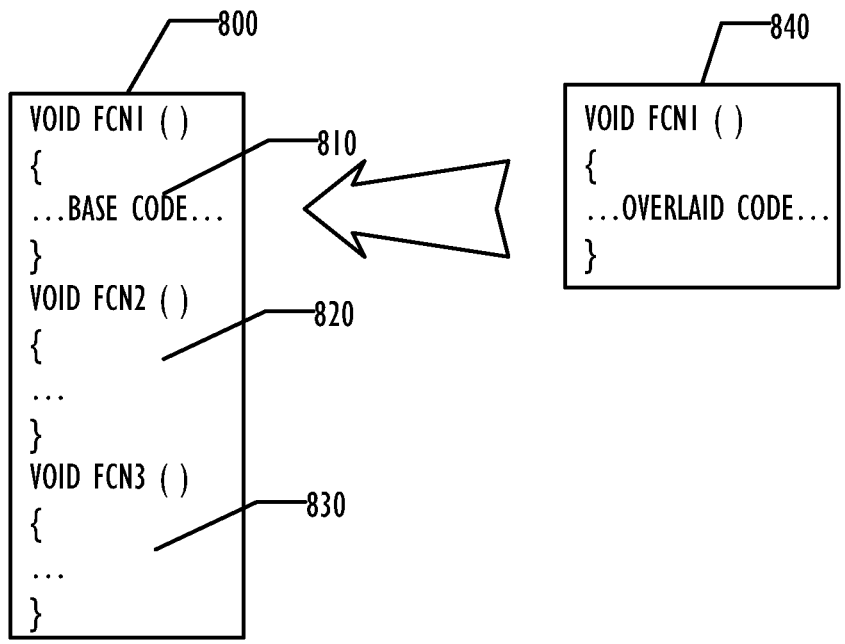
FIG. 8 illustrates, in block diagram form, an embodiment in which source code for a function is overlaid.

In another embodiment, the software code, such as callable functions of a program, may be overlaid. FIG. 8 illustrates a program 800 in which base functions 810, 820, and 830 may be overlaid. Overlaid functions may replace base functions, allowing users to execute the overlaid function instead of the base function. In one embodiment, in which program 800 is interpreted, an interpretation environment may replace the code for function 810 by the code for overlaid function 840 before interpretation, to affect the overlay. In one embodiment, this overlaying may be performed prior to execution of the program 800. The resultant program may be interpreted by the interpretation environment. In other embodiments, the interpretation environment may incorporate runtime control structures into the program 800 as part of the overlay process, to allow the interpretation environment to decide to execute either base function 810 or overlaid function 840 at each invocation of the function.

In a compiled language embodiment, an overlay generation tool may be employed to incorporate runtime control structures to allow the generation of a single executable that may be executed by both users 110 and 120 with different overlays, as illustrated by FIGS. 2-6 above. These control structures may be simple if-then-else or case statement type control structures, selecting the code segment to be executed for the invoking user, or other control structures known to the art for selecting which of multiple choices to execute. By compiling these control structures and the overlaid code segments into the executable, a single executable may be generated that decides at runtime which overlaid object should be executed.

In one embodiment, the overlaid objects may be stored in a database, together with information regarding overlay groups, access control information, and information regarding the application object to be overlaid by the overlaid object. An interpretation environment or compiler may then query the database and determine which, if any, of the overlaid objects should be used at runtime.

In one embodiment, overlaid objects may be stored or kept in memory as linked lists of overlaid objects, allowing traversal of the list of overlaid objects in the overlaid object or hierarchy to determine the appropriate overlaid (or original) object to use for a given user.

Although described above in terms of callable functions, any program code may be overlaid in various embodiments, including as little as a single line of code. In some embodiments, the overlaying technique overlays source code, which may be interpreted or compiled as desired. In other embodiments, the overlaid objects may be object or executable code stored in libraries that are dynamically included at runtime or by statically linking the overlaid routines into an executable with suitable control structures for selecting which routine to execute at runtime.

Figure 9:
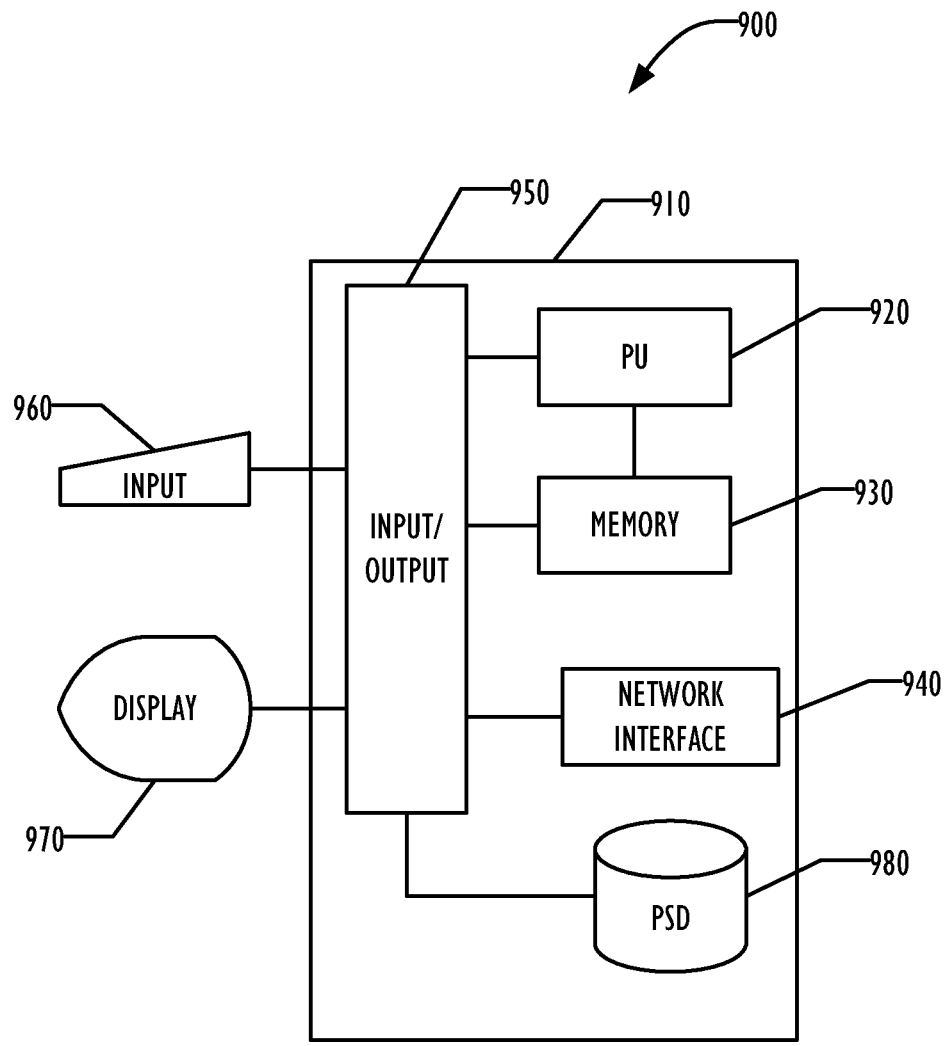
FIG. 9 illustrates, in block diagram form, an embodiment of a computer system for executing the disclosed techniques.

Referring now to FIG. 9, an example computer 900 for use in providing a transparent process context is illustrated in block diagram form. Example computer 900 comprises a system unit 910 which may be optionally connected to an input device or system 960 (e.g., keyboard, mouse, touch screen, etc.) and display 970. A program storage device (PSD) 980 (sometimes referred to as a hard disc) is included with the system unit 910. Also included with system unit 910 is a network interface 940 for communication via a network with other computing and corporate infrastructure devices (not shown). Network interface 940 may be included within system unit 910 or be external to system unit 910. In either case, system unit 910 will be communicatively coupled to network interface 940. Program storage device 980 represents any form of non-volatile storage including, but not limited to, all forms of optical and magnetic, including solid-state, storage elements, including removable media, and may be included within system unit 910 or be external to system unit 910. Program storage device 980 may be used for storage of software to control system unit 910, data for use by the computer 900, or both.

Figure 11:
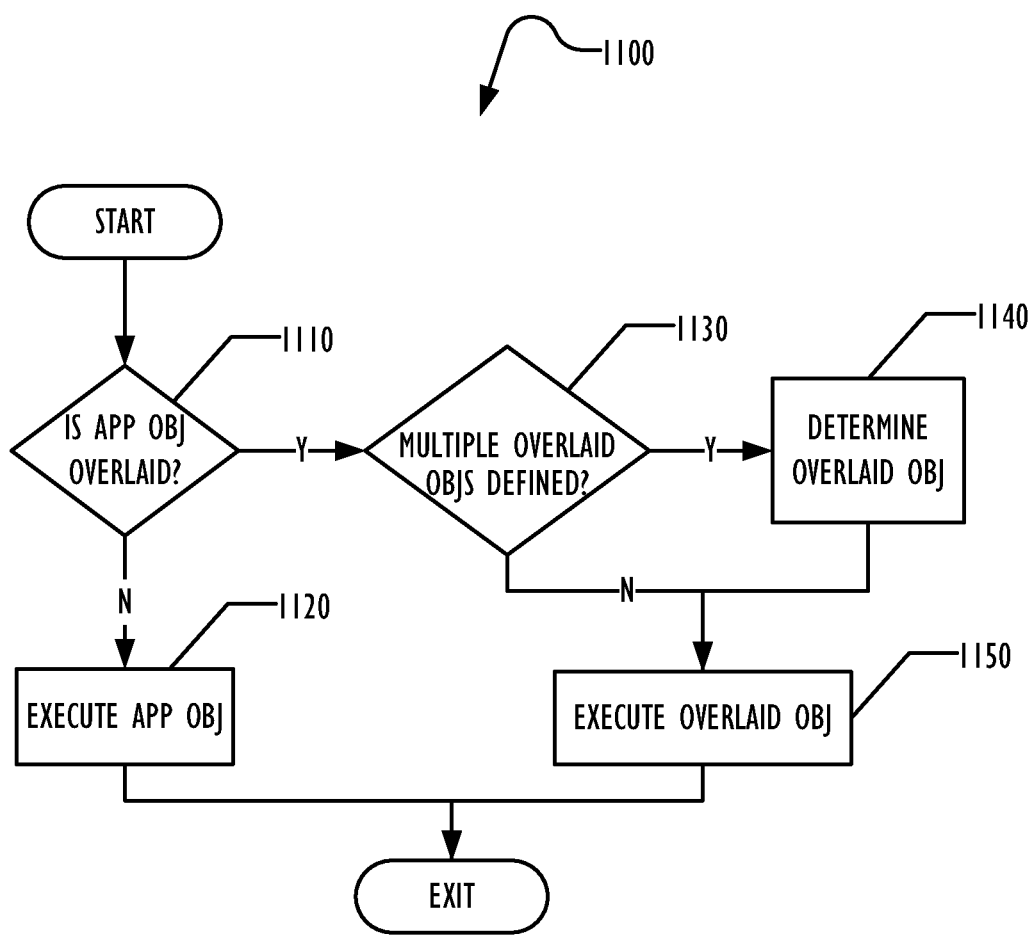
FIG. 11 illustrates, in flowchart form, an embodiment of a technique for determining whether to execute an application object or an overlaid object.

System unit 910 may be programmed to perform methods in accordance with this disclosure (an example of which is in FIG. 11). System unit 910 comprises a processor unit (PU) 920, input-output (I/O) interface 950 and memory 930. Processing unit 920 may include any programmable controller device including, for example, one or more members of the Intel Atom®, Core®, Pentium® and Celeron® processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 930 may include one or more memory modules and comprise random access memory (RAM), read only memory (ROM), programmable read only memory (PROM), programmable read-write memory, and solid-state memory. One of ordinary skill in the art will also recognize that PU 920 may also include some internal memory including, for example, cache memory.

Figure 10:
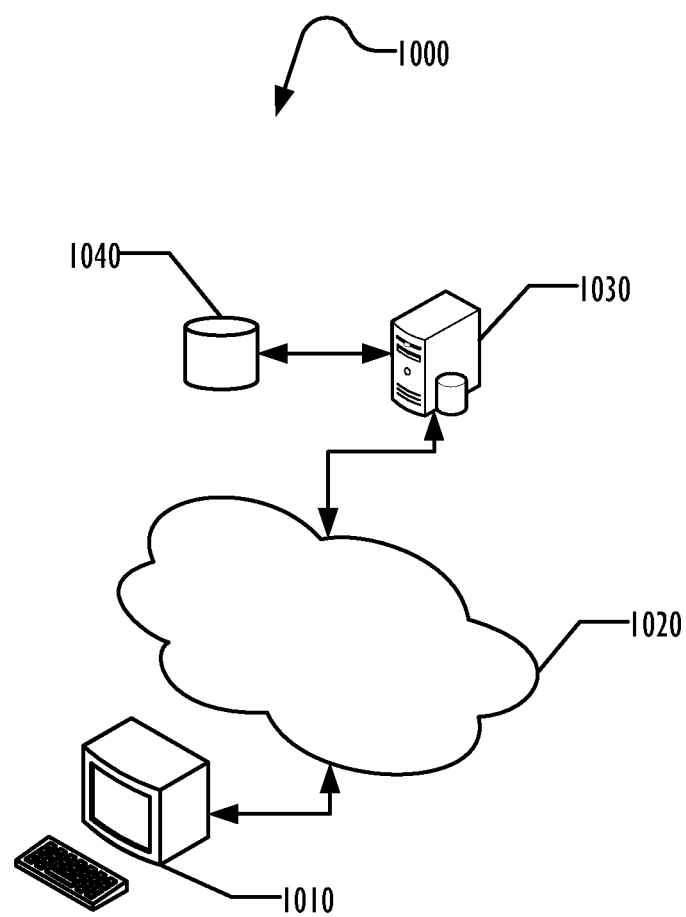
FIG. 10 illustrates, in block diagram form, an embodiment of a system for applying overlaid objects to application objects.

FIG. 10 illustrates a system 1000 for providing overlaid applications according to one embodiment. An application may be executed on the workstation 1010. A dictionary of overlaid objects and application objects may be stored in a data store 1040 that is managed by a server 1030. The server 1030 and workstation 1010 typically are connected by a network 1020, but may communicate across any connection type known to the art, using any convenient or desired communications protocol. In one embodiment, a request to execute the application on the workstation 1010 invokes a runtime environment that communicates with the server 1030 to query the data store 1040 for overlaid objects to be applied when executing the application for the requester. In one embodiment, the overlaid objects are present in the application and the server 1030 may supply information for runtime control structures in the application to determine which overlaid objects to execute on the workstation 1010. In another embodiment, the overlaid objects may be stored in the data store 1040 and supplied by the server 1030 as needed to the workstation 1010 for execution at the proper point of the application.

In one embodiment, the data store 1040 provides a dictionary objects, including original and overlaid objects. Each overlaid object definition includes information to link the object with the object which overlays. Thus, in the scenario illustrated in FIG. 4, overlaid object 410 may be defined in the dictionary as overlaying original application object 130, and as part of overlay group of 400, while overlaid object 470 is defined as being in overlay group 450 and overlaying overlaid object 420, which in turn is defined as overlaying original application object 150. When a user requests execution of the application 100 on either workstation 1010 or the server 1030, in one embodiment an interpretive environment may build and execute an instance of the application 100 for that user from its included objects, applying the chains of overlays to determine which objects to include for execution.

FIG. 11 is a flowchart illustrating a technique 1100 for applying an overlaid object according to one embodiment. In block 1110, the application runtime or interpretation environment may determine whether an application object that is to be executed is to be overlaid by any overlaid objects. If the application object is not to be overlaid because no overlaid objects have been defined that are applicable to this user, then in block 1120, the application object may be executed.

If the application object is to be overlaid, then in block 1130, a determination may be made whether more than one overlaid object is defined for this application object and are applicable for this user. Such a situation may occur where there are stacked levels of overlay groups or overlaid objects applicable for this user. If only one overlaid object defined for this application object is applicable for this user, then in block 1150, the overlaid object may be executed instead of the application object.

If multiple overlaid objects are defined for this application object and are applicable for this user, then in block 1140, determine which of the overlaid objects applicable for this user should be executed. This may involve examining multiple overlay groups and the hierarchy of those multiple overlay groups to determine the appropriate overlaid object to execute. After determining the overlaid object to execute, the object may be executed in block 1150.

In one embodiment, runtime components of the application or and interpretation environment for the application may record information during execution of the application, to record information about overlaid objects that are executed, to reduce execution overhead for future execution of the overlaid objects.

The disclosed embodiments allow application suppliers such as a vendor to update an application that has been customized by a site or a user, without making the user redo the customization. The disclosed embodiments also allow for a multi-tenancy situation, in a single application instance may be customized differently for different users or groups of users, without needing to create multiple permutations of customized applications.

The above blocks and arrangement of actions illustrated by FIG. 11 is intended to be illustrative and by way of example only, and the actions illustrated by the blocks therein may be combined or split into multiple actions, and may be reordered in different orders as desired. Other actions not shown in FIG. 11 may also be performed as convenient or desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A method, comprising:
   generating a software application in one of an interpreted computer environment and a compiled computer environment, wherein the generating of the software application includes,
   associating at least one first overlaid object with a first overlay group, the at least one overlaid object having a corresponding base object of the software application, the at least one overlaid object being configured to allow the application of a change to the base object while preserving customizations associated with the at least one overlaid object,
   assigning a first permission to the first overlay group,
   determining a user authorization associated with use of the first overlay group based on the first permission, and
   configuring the software application to execute using the at least one first overlaid object and the corresponding base object upon determining the user authorization to use the first overlay group.

2. The method of claim 1, further comprising:
   associating at least one second overlaid object with a second overlay group;
   assigning a second permission to the second overlay group;
   determining a user authorization associated with use of the second overlay group based on the second permission; and
   configuring the software application to execute using the at least one first overlaid object, the at least one second overlaid object and the corresponding base object upon determining the user authorization to use the second overlay group.

3. The method of claim 1, further comprising:
   associating at least one second overlaid object with a second overlay group;
   assigning a second permission to the second overlay group;
   determining a user authorization associated with use of the second overlay group based on the second permission; and
   configuring the software application to execute using the at least one second overlaid object instead of the corresponding base object upon determining the user authorization to use the second overlay group.

4. The method of claim 1, further comprising:
   configuring the software application to execute using the corresponding base object upon determining there is no user authorization to use the first overlay group.

5. The method of claim 1, wherein generating the software application is in response to receiving a request from a user to execute the software application.

6. The method of claim 1, further comprising:
   associating a second overlaid object with the at least one first overlaid object within the first overlay group; and
   configuring the software application to execute using the at least one first overlaid object, the corresponding base object and the second overlaid object.

7. The method of claim 1, further comprising
   associating one of the at least one first overlaid object with a first base object of a software application includes,
   storing a definition of the first base object in a dictionary, and storing a definition of the one of the at least one first overlaid object in the dictionary, indicating that the one of the at least one first overlaid object overlays the first base object.

8. The method of claim 1, wherein
the software application is interpreted by an interpretation environment, and wherein
the generating of the software application to execute includes,
  querying a dictionary for information regarding objects associated with the software application, responsive to a request to execute the software application, and
  determining whether to execute at least one of the base object and the first overlaid object.

9. The method of claim 1, wherein the at least one first overlaid object replaces a portion of the corresponding base object.

10. The method of claim 1, wherein the at least one first overlaid object adds functionality to the corresponding base object.

11. A networked computer system, comprising:
a server computer;
a datastore, coupled to the server;
a client computer, communicatively coupled to the server computer;
a plurality of software application base objects, stored in the datastore;
a plurality of software application overlaid objects, stored in the datastore, each of the plurality of software application overlaid objects being configured to allow the application of a change to a corresponding base object of the software application while preserving customizations associated with the at least one overlaid object, wherein at least one first overlaid object is associated with a first overlay group, the at least one overlaid object having a corresponding base object;
a first permission, stored in the datastore, to the first overlay group; and
a runtime environment, stored in the datastore, including instructions that when executed cause the server to,
  receive a request from the client computer to execute a software application,
  determine a user authorization associated with the client computer to and associated with use of the first overlay group based on the first permission, and
  configure the software application to execute in the computer system using the at least one first overlaid object and the corresponding base object upon determining the user associated with client computer is authorized to use the first overlay group.

12. The networked computer system of claim 11, further comprising:
a dictionary, stored in the datastore, comprising:
  information associating each of the plurality of software application base objects with a software application; and
  information associating each of the plurality of software application overlaid objects with a member of the plurality of software application objects or a member of the plurality of software application overlaid objects, wherein
    selecting a first software application overlaid object of the plurality of software application overlaid objects to be executed by the client instead of the application base object, responsive to the request includes querying the dictionary.

13. The networked computer system of claim 12, the dictionary further comprising:
information associating each of the plurality of software application overlaid objects with an overlay group of a plurality of overlay groups, wherein
  querying the dictionary includes selecting overlaid objects of the plurality of software application overlaid objects that are associated with a first overlay group of the plurality of overlay groups.

14. The networked computer system of claim 11, wherein the software application is interpreted on the client computer by an interpretation environment.

15. The networked computer system of claim 11, wherein
at least one second overlaid object is associated with a second overlay group;
a second permission is assigned to the second overlay group; and
the runtime environment further include instructions that when executed cause the server to,
  determining a user authorization associated with use of the second overlay group based on the second permission; and
  configure the software application to execute using the at least one first overlaid object, the at least one second overlaid object and the corresponding base object upon determining the user authorization to use the second overlay group.

16. The networked computer system of claim 11, wherein
at least one second overlaid object is associated with a second overlay group;
a second permission is assigned to the second overlay group; and
the runtime environment further include instructions that when executed cause the server to,
  determine a user authorization associated with use of the second overlay group based on the second permission; and
  configure the software application to execute in the computer system using the at least one second overlaid object instead of the corresponding base object upon determining the user authorization to use the second overlay group.

17. A computer system, comprising:
a processor;
a datastore, coupled to the processor;
a plurality of software application base objects, stored in the datastore;
a plurality of software application overlaid objects, stored in the datastore, each of the plurality of software application overlaid objects being configured to allow the application of a change to a corresponding base object of the software application while preserving customizations associated with the plurality of software application overlaid objects;
a software application, stored in the datastore, configured for execution by the processor, including:
  a first software application base object; and
  a runtime environment for the software application, stored in the datastore, including instructions that when executed cause the processor to:
    determine a user authorization associated with use of a first software application overlaid object based on a permission associated with a first overlay group, and
    configure the software application to execute using the first software application overlaid object and a corresponding software application base object upon determining the user authorization to use the first software application overlaid object.

18. The computer system of claim 17, further comprising: a plurality of overlay groups, each including a member of the plurality of software application overlaid objects.

19. The computer system of claim 17, wherein the first software application overlaid object replaces a portion of the corresponding software application base object.

20. The computer system of claim 17, wherein the first software application overlaid object adds functionality to the corresponding software application base object.

* * * * *